(12) United States Patent
Morisaki

(10) Patent No.: US 12,743,074 B2
(45) Date of Patent: Sep. 22, 2026

(54) NUMERICAL CONTROLLER

(71) Applicant: Fanuc Corporation, Minamitsuru-gun (JP)

(72) Inventor: Kazuhiko Morisaki, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 200 days.

(21) Appl. No.: 18/693,739

(22) PCT Filed: Sep. 30, 2021

(86) PCT No.: PCT/JP2021/036159
§ 371 (c)(1),
(2) Date: Mar. 20, 2024

(87) PCT Pub. No.: WO2023/053349
PCT Pub. Date: Apr. 6, 2023

(65) Prior Publication Data

US 2024/0377813 A1 Nov. 14, 2024

(51) Int. Cl.
*G05B 19/4155* (2006.01)

(52) U.S. Cl.
CPC .................... *G05B 19/4155* (2013.01); *G05B 2219/35519* (2013.01)

(58) Field of Classification Search
None
See application file for complete search history.

(56) References Cited

U.S. PATENT DOCUMENTS

2001/0027354 A1* 10/2001 Kakino .............. G05B 19/4163
700/173
2019/0079489 A1 3/2019 Natsuhara et al.
(Continued)

FOREIGN PATENT DOCUMENTS

JP H0683429 A 3/1994
JP 2001255921 A 9/2001
(Continued)

OTHER PUBLICATIONS

International Search Report (PCT/ISA/210) with translation and Written Opinion (PCT/ISA/237) mailed on Dec. 14, 2021, by the Japanese Patent Office as the International Searching Authority for International Application No. PCT/JP2021/036159. (9 pages).
(Continued)

*Primary Examiner* — Ryan A Jarrett
(74) *Attorney, Agent, or Firm* — BUCHANAN INGERSOLL & ROONEY PC

(57) ABSTRACT

A numerical controller includes: a control unit that interprets a machining program including tool information for identifying a tool to control the axis of a machine tool; a feedback information acquisition unit that acquires, from the machine tool, feedback information indicating the position of the axis; a tool change information acquisition unit that acquires, from the machine tool, change information indicating that the tool has been changed; a synthesis information generation unit that synthesizes the feedback information with the tool information and change information acquired by the tool change information acquisition unit; a shape information storage unit that stores shape information indicating the shape of the tool; a machining simulation unit that executes workpiece machining simulation on the basis of the synthesis information and the shape information; and
(Continued)

an output unit that outputs machined shape information indicating the shape of the machined workpiece.

4 Claims, 7 Drawing Sheets

(56) References Cited

U.S. PATENT DOCUMENTS

2020/0133225 A1 4/2020 Hada et al.
2023/0079780 A1 3/2023 Oya et al.
2024/0377813 A1 11/2024 Morisaki

FOREIGN PATENT DOCUMENTS

JP 2019-053718 A 4/2019
JP 2020071734 A 5/2020
JP 2021128709 A 9/2021
WO 2023/053349 A1 4/2023

OTHER PUBLICATIONS

Office Action (Notice of Reasons for Refusal) issued Mar. 10, 2026, by the Japan Patent Office in corresponding Japanese Patent Application No. 2025-070582 and an English translation of the Office Action. (14 pages).
Office Action (The First Office Action) issued Jul. 23, 2026, by the State Intellectual Property Office of People's Republic of China in corresponding Chinese Patent Application No. 202180102651.X and an English translation of the Office Action. (15 pages).

* cited by examiner

1
MACHINE TOOL
2
NUMERICAL CONTROLLER
202
201
HARDWARE PROCESSOR
203
ROM
204
RAM
205
NONVOLATILE MEMORY
206
INTERFACE
3
INPUT/OUTPUT DEVICE
207
AXIS CONTROL CIRCUIT
4
SERVO AMPLIFIER
5
SERVOMOTOR
208
SPINDLE CONTROL CIRCUIT
6
SPINDLE AMPLIFIER
7
SPINDLE MOTOR
209
PLC
210
I/O UNIT
8
AUXILIARY DEVICE

2
NUMERICAL CONTROLLER
21
PROGRAM STORAGE UNIT
22
CONTROL UNIT
23
FEEDBACK INFORMATION ACQUISITION UNIT
24
TOOL CHANGE INFORMATION ACQUISITION UNIT
25
SYNTHESIS INFORMATION GENERATION UNIT
27
MACHINING SIMULATION UNIT
26
SHAPE INFORMATION STORAGE UNIT
28
OUTPUT UNIT

```
        .
        .
        .
N11  T01 M06 ;
N12  G00 X100. Y100. ;
N13  G00 Z3. ;
N14  G01 Z-2.8 F500. ;
N15  G01 X120. Y120. ;
        .
        .
        .
N21  T02 M06 ;
N22  G00 X100. Y100. ;
N23  G00 Z3. ;
N24  G01 Z-3. F250. ;
N25  G01 X120. Y120. ;
        .
        .
        .
```

| No. | FEEDBACK INFORMATION | CHANGE INFORMATION | TOOL INFORMATION |
|---|---|---|---|
| 1 | X1、Y1、Z1 | Null | Null |
| 2 | X2、Y2、Z2 | COMPLETE | T01 |
| 3 | X3、Y3、Z3 | Null | Null |
| 4 | X4、Y4、Z4 | Null | Null |
| ⋮ | ⋮ | ⋮ | ⋮ |
| n | Xn、Yn、Zn | COMPLETE | T02 |
| n+1 | Xn+1、Yn+1、Zn+1 | Null | Null |

FIG.5

| TOOL NUMBER | TOOL TYPE | BLADE DIAMETER | BLADE LENGTH | SHANK DIAMETER | TOTAL LENGTH | ... |
|---|---|---|---|---|---|---|
| 1 | FLAT END MILL | D6.0 | 12 | 6 | 55 | ... |
| 2 | BALL END MILL | R1.0 | 4 | 4 | 60 | ... |
| ⋮ | ⋮ | ⋮ | ⋮ | ⋮ | ⋮ | ⋮ |

FIG.7

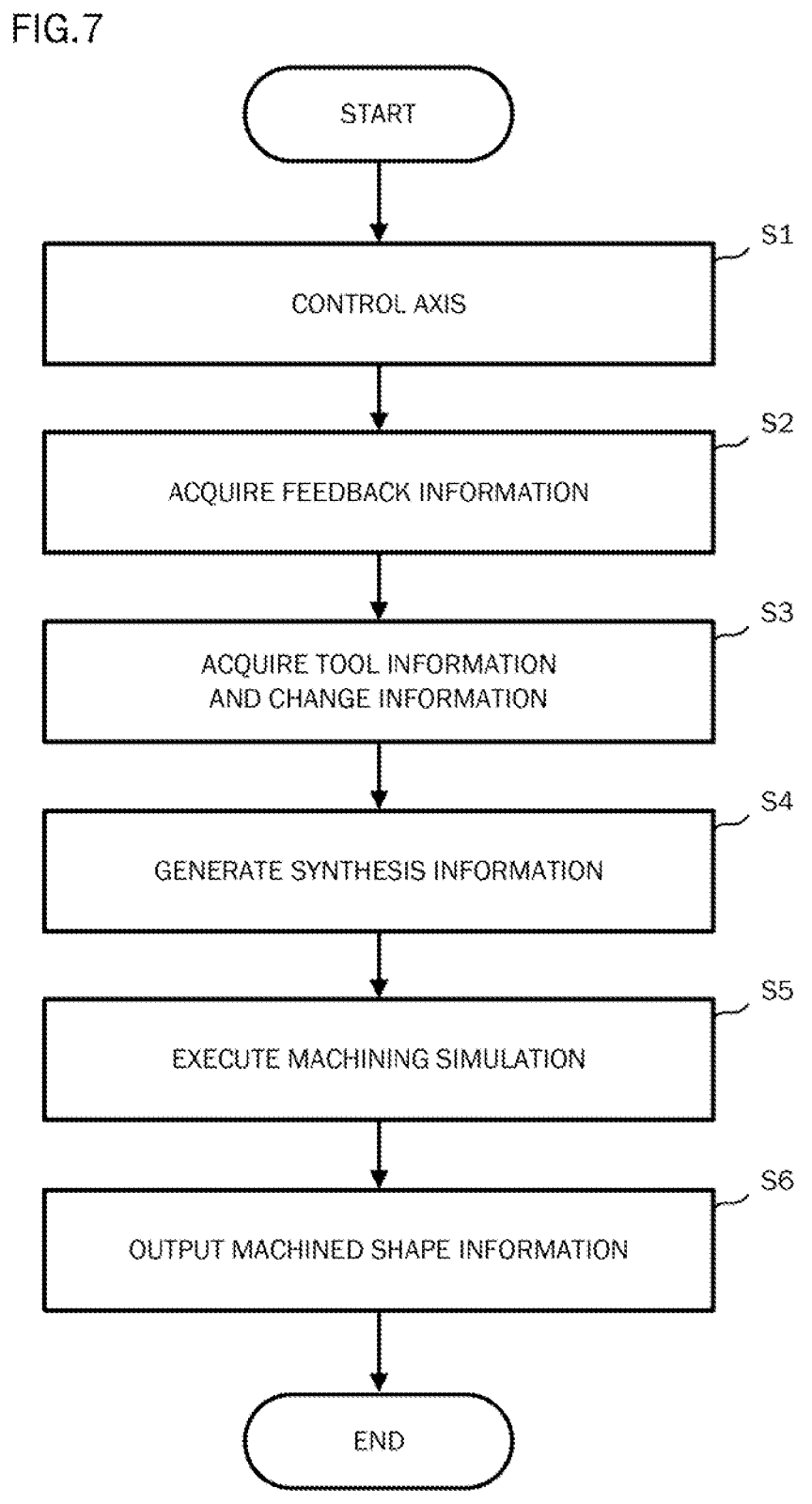

START

S1 CONTROL AXIS

S2 ACQUIRE FEEDBACK INFORMATION

S3 ACQUIRE TOOL INFORMATION AND CHANGE INFORMATION

S4 GENERATE SYNTHESIS INFORMATION

S5 EXECUTE MACHINING SIMULATION

S6 OUTPUT MACHINED SHAPE INFORMATION

END

NUMERICAL CONTROLLER

CROSS REFERENCE TO RELATED APPLICATIONS

This is the U.S. National Phase application of PCT/JP2021/036159, filed Sep. 30, 2021, the disclosure of this application being incorporated herein by reference in its entirety for all purposes.

FIELD OF THE INVENTION

The present disclosure relates to a numerical controller for a machine tool.

BACKGROUND OF THE INVENTION

Conventionally, in a numerical controller, machining simulation has been conducted in consideration of an influence on machined surface quality due to vibration of a machine tool caused by acceleration and jerk of a drive axis using feedback information from a servomotor (Patent Document 1). By using the feedback information, it is possible to conduct machining simulation reflecting actual axis movement of the machine tool.

PATENT DOCUMENT

Patent Document 1: JP 2020-71734 A

SUMMARY OF THE INVENTION

However, the feedback information acquired from the servomotor does not include information related to tool change. Therefore, when the feedback information is used, machining simulation including tool change simulation cannot be performed.

Meanwhile, it is conceivable to simulate tool change based on a tool change command included in a machining program. However, a lag occurs between timing at which tool change is commanded and timing at which tool change is actually executed in the machine tool. Therefore, it is impossible to synchronously incorporate the tool change simulation into the simulation conducted based on the feedback information.

An object of the disclosure is to provide a numerical controller capable of executing machining simulation by synchronously incorporating tool change simulation into simulation conducted based on feedback information.

A numerical controller includes a control unit configured to analyze a machining program including tool information that specifies a tool and control an axis of a machine tool, a feedback information acquisition unit configured to acquire feedback information indicating a position of the axis from the machine tool, a tool change information acquisition unit configured to acquire the tool information from the machining program and to acquire change information indicating that the tool has been changed from the machine tool, a synthesis information generation unit configured to generate synthesis information by synthesizing the feedback information acquired by the feedback information acquisition unit and the tool information and the change information acquired by the tool change information acquisition unit, a shape information storage unit configured to store shape information indicating a shape of the tool, a machining simulation unit configured to execute machining simulation of a workpiece based on the synthesis information and the shape information, and an output unit configured to output machined shape information indicating a shape of the workpiece after machining generated by executing the machining simulation.

According to an aspect of the disclosure, an object is to provide a numerical controller capable of executing machining simulation by synchronously incorporating tool change simulation into simulation conducted based on feedback information.

BRIEF DESCRIPTION OF DRAWINGS

FIG. 3 is a diagram illustrating an example of a machining program;

FIG. 4 is a diagram illustrating an example of synthesis information;

FIG. 5 is a diagram illustrating an example of shape information;

FIG. 7 is a diagram for describing an example of a flow of processing executed by the numerical controller.

Embodiments of the disclosure will be described below with reference to the drawings. Note that not all combinations of features described in the embodiments below are necessary to solve the problem. Further, more detailed description than necessary may be omitted. Further, the following description of the embodiments and the drawings are provided to help those skilled in the art to fully understand the disclosure, and are not intended to limit the scope of the claims.

Figure 1:
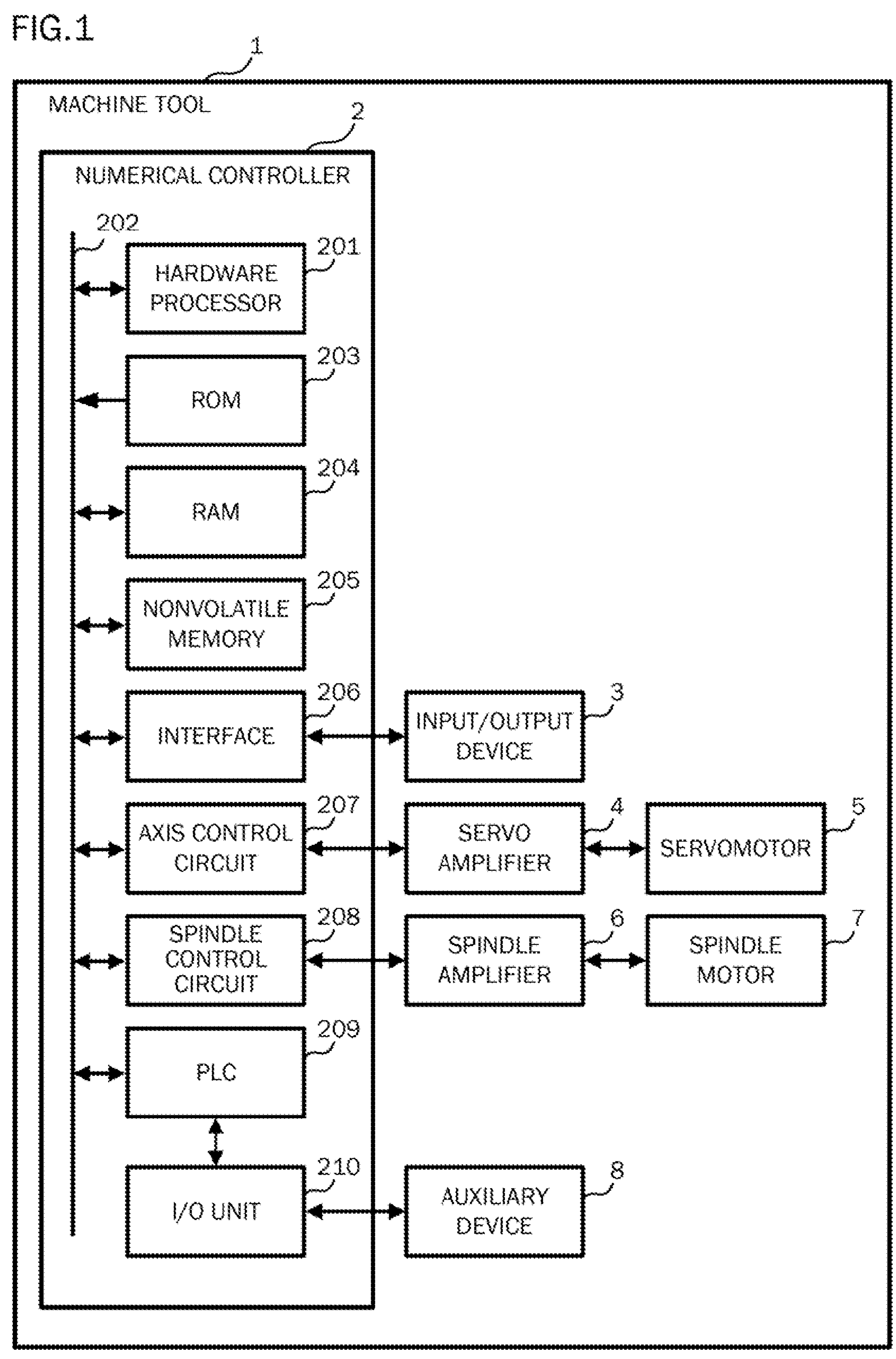
FIG. 1 is a block diagram illustrating an example of a hardware configuration of a machine tool.

FIG. 1 is a block diagram illustrating an example of a hardware configuration of a machine tool including a numerical controller. The machine tool 1 includes a lathe, a machining center, and a multi-tasking machine.

The machine tool 1 includes the numerical controller 2, an input/output device 3, a servo amplifier 4, a servomotor 5, a spindle amplifier 6, a spindle motor 7, and an auxiliary device 8.

The numerical controller 2 is a device that controls the entire machine tool 1. The numerical controller 2 includes a hardware processor 201, a bus 202, a ROM (Read Only Memory) 203, a RAM (Random Access Memory) 204, and a nonvolatile memory 205.

The hardware processor 201 is a processor that controls the entire numerical controller 2 according to a system program. The hardware processor 201 reads a system program, etc. stored in the ROM 203 via the bus 202, and performs various processes based on the system program. The hardware processor 201 controls the servomotor 5 and the spindle motor 7 based on a machining program. The hardware processor 201 is, for example, a CPU (Central Processing Unit) or an electronic circuit.

The hardware processor 201 performs, for example, analysis of a machining program and output of control commands to the servomotor 5 and the spindle motor 7 for each control cycle.

The bus 202 is a communication path that connects respective pieces of hardware in the numerical controller 2 to each other. The respective pieces of hardware in the numerical controller 2 exchange data via the bus 202.

The ROM 203 is a storage device that stores a system program, etc. for controlling the entire numerical controller 2. The ROM 203 is a computer-readable storage medium.

The RAM 204 is a storage device that temporarily stores various data. The RAM 204 functions as a work area for the hardware processor 201 to process various data.

The nonvolatile memory 205 is a storage device that retains data even when the machine tool 1 is powered off and the numerical controller 2 is not supplied with power. The nonvolatile memory 205 stores, for example, a machining program and various parameters. The nonvolatile memory 205 is a computer-readable storage medium. The nonvolatile memory 205 includes, for example, a memory backed up by a battery or an SSD (Solid State Drive).

The numerical controller 2 further includes an interface 206, an axis control circuit 207, a spindle control circuit 208, a PLC (Programmable Logic Controller) 209, and an I/O unit 210.

The interface 206 connects the bus 202 and the input/output device 3 to each other. For example, the interface 206 sends various data processed by the hardware processor 201 to the input/output device 3.

The input/output device 3 is a device that receives various data via the interface 206 and displays the various data. Further, the input/output device 3 accepts input of various data and sends the various data to the hardware processor 201 via the interface 206. The input/output device 3 is, for example, a touch panel. When the input/output device 3 is a touch panel, the touch panel is, for example, a capacitive type touch panel. Note that the touch panel is not limited to a capacitive type, and may be a touch panel of another type. The input/output device 3 is installed, for example, on a control panel (not illustrated) in which the numerical controller 2 is stored.

The axis control circuit 207 is a circuit that controls the servomotor 5. The axis control circuit 207 receives control commands from the hardware processor 201 and outputs various commands for driving the servomotor 5 to the servo amplifier 4. For example, the axis control circuit 207 sends a torque command for controlling the torque of the servomotor 5 to the servo amplifier 4.

The servo amplifier 4 receives a command from the axis control circuit 207 and supplies a current to the servomotor 5.

The servomotor 5 is driven by receiving supply of a current from the servo amplifier 4. The servomotor 5 is connected to, for example, a ball screw that drives a tool post. By driving the servomotor 5, a structure of the machine tool 1, such as the tool post, moves in each axis direction. The servomotor 5 incorporates an encoder (not illustrated) that detects a position and speed of the axis, and feeds back position/speed feedback information from this encoder to the axis control circuit 207 to perform position/speed feedback control.

Note that the servomotor 5 is provided for each axis. That is, the servomotor 5 includes an X-axis servomotor, a Y-axis servomotor, and a Z-axis servomotor. The servomotor 5 may further include an A-axis servomotor, a B-axis servomotor, and a C-axis servomotor. The axis control circuit 207 and the servo amplifier 4 are provided for each axis.

The spindle control circuit 208 is a circuit for controlling the spindle motor 7. The spindle control circuit 208 receives a control command from the hardware processor 201 and outputs a command for driving the spindle motor 7 to the spindle amplifier 6. For example, the spindle control circuit 208 sends a spindle speed command for controlling a rotational speed of the spindle motor 7 to the spindle amplifier 6.

The spindle amplifier 6 receives a command from the spindle control circuit 208 and supplies a current to the spindle motor 7.

The spindle motor 7 is driven by receiving supply of a current from the spindle amplifier 6. The spindle motor 7 is connected to a spindle and rotates the spindle.

The PLC 209 is a device that executes a ladder program to control the auxiliary device 8. The PLC 209 sends a command to the auxiliary device 8 via the I/O unit 210.

The I/O unit 210 is an interface that connects the PLC 209 and the auxiliary device 8 to each other. The I/O unit 210 sends a command received from the PLC 209 to the auxiliary device 8.

The auxiliary device 8 is a device installed in the machine tool 1 to perform an auxiliary operation in the machine tool 1. The auxiliary device 8 operates based on a command received from the I/O unit 210. The auxiliary device 8 may be a device installed around the machine tool 1. The auxiliary device 8 is, for example, a tool changer, a cutting fluid injection device, or an opening/closing door drive device.

Next, a function of the numerical controller 2 will be described. The numerical controller 2 moves each axis by controlling the servomotor 5. Further, the numerical controller 2 rotates the spindle motor 7. As a result, the numerical controller 2 machines a workpiece. Further, the numerical controller 2 executes machining simulation based on feedback information.

For example, the feedback information is information acquired from the servomotor 5. The information acquired from the servomotor 5 is information indicating a position of an axis. For example, feedback information acquired from the X-axis servomotor is information indicating a position of the X-axis. Further, feedback information acquired from the Y-axis servomotor is information indicating a position of the Y-axis.

Figure 2:
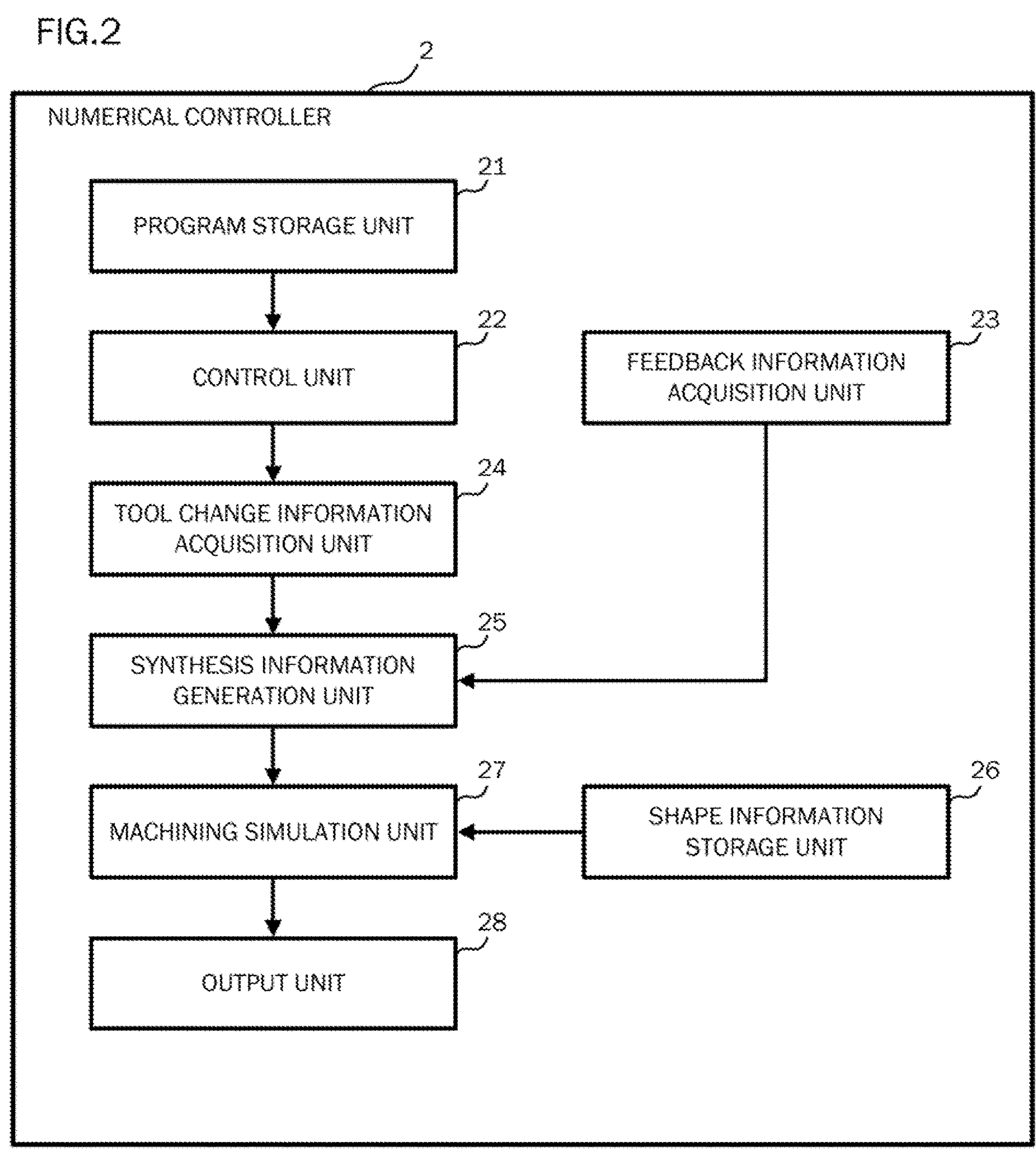
FIG. 2 is a diagram illustrating an example of a function of a numerical controller.

FIG. 2 is a block diagram illustrating an example of the function of the numerical controller 2. The numerical controller 2 includes a program storage unit 21, a control unit 22, a feedback information acquisition unit 23, a tool change information acquisition unit 24, a synthesis information generation unit 25, a shape information storage unit 26, a machining simulation unit 27, and an output unit 28.

The program storage unit 21 and the shape information storage unit 26 are realized by storing a machining program input from the input/output device 3, etc. and shape information indicating a shape of the tool in the RAM 204 or the nonvolatile memory 205.

For example, the control unit 22, the feedback information acquisition unit 23, the tool change information acquisition unit 24, the synthesis information generation unit 25, the machining simulation unit 27, and the output unit 28 are realized by the hardware processor 201 performing arithmetic processing using a system program stored in the ROM 203 and various data stored in the nonvolatile memory 205.

The program storage unit 21 stores a machining program. The machining program includes at least one of a turning program and a milling program. The machining program includes a command for designating a movement path of the tool. The command for designating the movement path of the tool is, for example, a positioning command, a linear interpolation command, and a circular interpolation command. Further, the machining program includes tool information specifying a tool used for machining. The tool information is, for example, information indicating a tool number included in a tool selection command.

FIG. 3 is a diagram illustrating an example of a machining program. Code T written in a block having a sequence number N11 is a tool selection command. In other words, a command "T01" is a command for selecting a tool having a tool number 1. Further, a command "M06" is a command for executing tool change. Therefore, the block having the sequence number N11 designates changing a tool with the tool having the tool number 1.

A command "G00" written in a block having a sequence number N12 is a positioning command. Further, "X100. Y100." is a command designating a position where the tool is positioned. Therefore, the block having the sequence number N12 designates positioning the tool at a position of X100 and Y100. Furthermore, a block having a sequence number N13 designates positioning the tool at a position of Z3.

A command "G01" written in a block having a sequence number N14 is a linear interpolation command. Further, "Z-2.8" is a command designating a movement destination of the tool. In addition, code F is a command designating a feed rate of the tool. In other words, the block having the sequence number N14 designates moving the tool by linear interpolation to a position of Z-2.8 at a feed rate 500 [mm/min]. A block having a sequence number N15 designates moving the tool by linear interpolation to a position of X120 and Y120.

A block having a sequence number N21 designates changing the tool with a tool having a tool number 2.

A block having a sequence number N22 designates positioning the tool at a position of X100 and Y100. Further, a block having a sequence number N23 designates positioning the tool at a position of Z3.

A block having a sequence number N24 designates moving the tool by linear interpolation to a position of Z-3 at a feed rate 250 [mm/min]. A block having a sequence number N25 designates moving the tool by linear interpolation to a position of X120 and Y120. Note that, for example, the machining program ends by designating an end-of-program command M30. Here, a description of FIG. 2 will be given again.

The control unit 22 controls an axis of the machine tool 1 by analyzing a machining program including tool information that specifies the tool. The axis of the machine tool 1 includes the X-axis, the Y-axis, and a Z-axis. For example, the control unit 22 analyzes the machining program illustrated in FIG. 3 and controls each axis. As a result, the tool moves along a movement path designated by the machining program.

The feedback information acquisition unit 23 acquires feedback information indicating a position of an axis from the machine tool 1. The feedback information is time series data. In other words, the feedback information is data indicating a movement path of the tool.

When the feedback information acquisition unit 23 acquires the feedback information, a workpiece does not need to be machined. In other words, the feedback information may be acquired in a state where no workpiece is installed on a workpiece gripping portion. Alternatively, the workpiece may be machined when the feedback information acquisition unit 23 acquires the feedback information. In other words, the feedback information may be acquired while the workpiece is installed on the workpiece gripping portion.

For example, the feedback information acquisition unit 23 acquires information indicating a position of each axis for each predetermined control cycle. For example, the feedback information acquisition unit 23 acquires feedback information indicating positions of the X-axis, the Y-axis, and a Z-axis within a period of one control cycle. The one control cycle is, for example, several milliseconds.

The feedback information acquisition unit 23 acquires feedback information (the feedback information includes information indicating at least one of a position, a speed, and acceleration of a motor) from the servomotor that drives each axis of the machine tool 1. Alternatively, for example, the feedback information may be acquired from a linear encoder installed along each linear axis of the machine tool 1, or from a rotary encoder installed around each rotating axis.

The tool change information acquisition unit 24 acquires tool information from the machining program, and acquires change information indicating that the tool has been changed from the machine tool 1. For example, the tool change information acquisition unit 24 acquires tool information stored in a predetermined register (not illustrated) by the control unit 22 analyzing the machining program. As described above, the tool information is information indicating a tool number included in a tool selection command.

The change information is information indicating that tool change has been completed. Completion of tool change means that a tool designated by the machining program is attached to the tool spindle, and the axis can be moved. The information indicating that tool change has been completed is, for example, a signal output from a proximity switch installed at a predetermined position.

The synthesis information generation unit 25 generates synthesis information by synthesizing feedback information acquired by the feedback information acquisition unit 23 and tool information and change information acquired by the tool change information acquisition unit 24.

The synthesis information generation unit 25 generates synthesis information by causing a time axis related to acquisition of feedback information to coincide with a time axis related to acquisition of change information. Causing the time axes to coincide with each other means synchronization. For example, the feedback information acquisition unit 23 and the tool change information acquisition unit 24 acquire feedback information and change information, respectively, within one control cycle. The synthesis information generation unit 25 causes the time axes to coincide with each other by combining the feedback information and the change information acquired within the one control cycle. In this way, the synthesis information generation unit 25 can generate information indicating the position of each axis when tool change is completed.

FIG. 4 is a diagram illustrating an example of synthesis information. The synthesis information is time series data obtained by combining feedback information, change information, and tool information.

Synthesis information of No. 1 includes feedback information. The feedback information includes data "X1, Y1, Z1" indicating positions of the X-axis, Y-axis, and Z-axis, respectively. Further, synthesis information of No. 1 does not include change information and tool information. In this case, in a control cycle in which the feedback information acquisition unit 23 acquires the feedback information of No. 1, the tool change information acquisition unit 24 does not acquire change information.

Synthesis information of No. 2 includes feedback information. The feedback information includes data "X2, Y2, Z2" indicating positions of the X-axis, Y-axis, and Z-axis, respectively. Further, the synthesis information of No. 2 includes change information “complete” and tool information “T01”. In this case, in a control cycle in which the feedback information acquisition unit 23 acquires the feedback information of No. 2, the tool change information acquisition unit 24 acquires change information.

Synthesis information of No. 3 includes feedback information. The feedback information includes data “X3, Y3, Z3” indicating positions of the X-axis, Y-axis, and Z-axis, respectively. Further, the synthesis information of No. 3 does not include change information and tool information.

Synthesis information of No. 4 includes feedback information. The feedback information includes data “X4, Y4, Z4” indicating positions of the X-axis, Y-axis, and Z-axis, respectively. Further, the synthesis information of No. 4 does not include change information and tool information.

Synthesis information of No. n includes feedback information. The feedback information includes data “Xn, Yn, Zn” indicating positions of the X-axis, Y-axis, and Z-axis, respectively. Further, the synthesis information of No. n includes change information “complete” and tool information “T02”. In this case, in a control cycle in which the feedback information acquisition unit 23 acquires the feedback information of No. n, the tool change information acquisition unit 24 acquires change information.

Synthesis information of No. n+1 includes feedback information. The feedback information includes data “Xn+1, Yn+1, Zn+1” indicating positions of the X-axis, Y-axis, and Z-axis, respectively. Further, the synthesis information of No. n+1 does not include change information and tool information. Here, a description of FIG. 2 will be given again.

The shape information storage unit 26 stores shape information indicating the shape of the tool. The shape information includes, for example, information indicating a tool type, a blade diameter, a blade length, a shank diameter, and a total length.

FIG. 5 is a diagram illustrating an example of shape information. Tool number 1 stores shape information of a tool having a tool type of flat end mill, a blade diameter of D6.0 [mm], a blade length of 12 [mm], a shank diameter of 6 [mm], and a total length of 55 [mm].

Tool number 2 stores shape information of a tool having a tool type of ball end mill, a blade diameter of R1.0 [mm], a blade length of 4 [mm], a shank diameter of 4 [mm], and a total length of 60 [mm]. Furthermore, tool number 3 or subsequent tool number may store shape information of a tool.

Figure 6A:
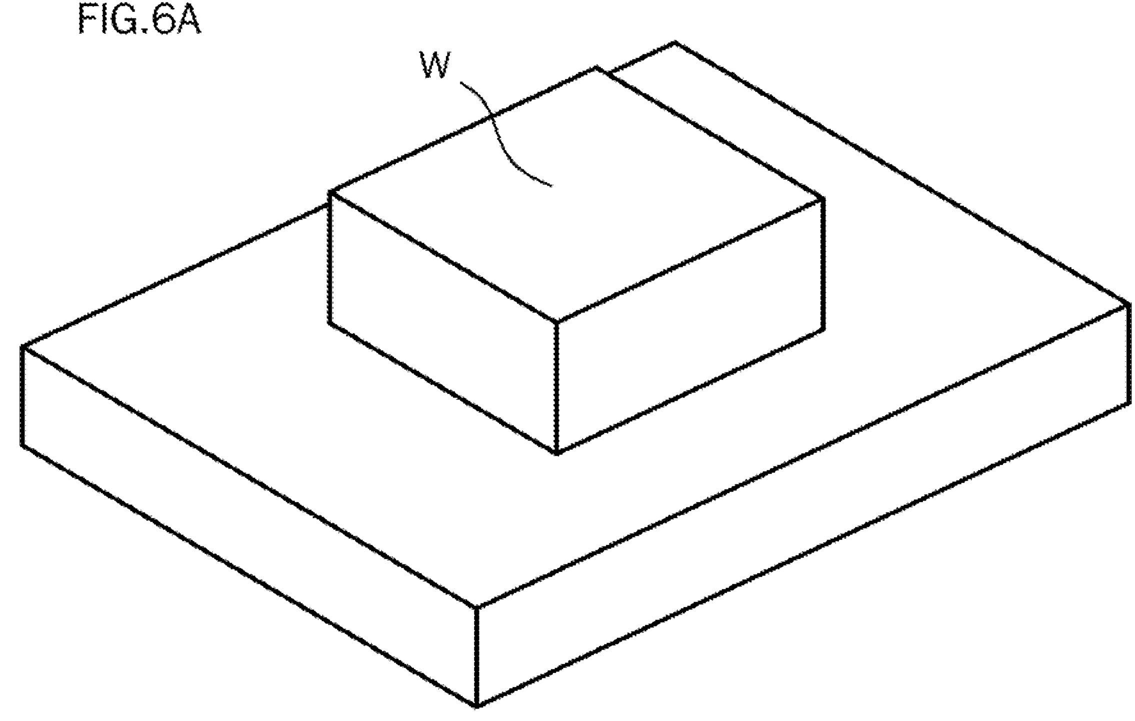
FIG. 6A is a diagram illustrating an example of machining simulation.

The machining simulation unit 27 executes machining simulation of a workpiece based on synthesis information and shape information. The machining simulation unit 27 may execute machining simulation by further using workpiece shape information indicating a shape of the workpiece. In this case, the shape information storage unit 26 may store the workpiece shape information indicating the shape of the workpiece. When the machining simulation unit 27 executes simulation using the workpiece shape information, the machining simulation unit 27 draws, for example, a workpiece W before machining illustrated in FIG. 6A.

The machining simulation unit 27 draws a position of the tool based on data indicating the position of each axis included in the synthesis information. When the machining simulation unit 27 executes, for example, machining simulation based on the synthesis information illustrated in FIG. 4, the machining simulation unit 27 first draws the tool at the position (X1, Y1, Z1) indicated by the feedback information of No. 1. The tool drawn at this time is, for example, a tool last used in previous machining simulation.

Next, the machining simulation unit 27 draws the tool at the position (X2, Y2, Z2) indicated by the feedback information of No. 2. Furthermore, the machining simulation unit 27 performs drawing of tool change at this position. That is, the machining simulation unit 27 performs drawing in which tool change is performed on the tool having tool number 1. For example, when the shape information storage unit 26 stores the shape information illustrated in FIG. 5, the machining simulation unit 27 performs drawing in which tool change is performed on the flat end mill.

Figure 6B:
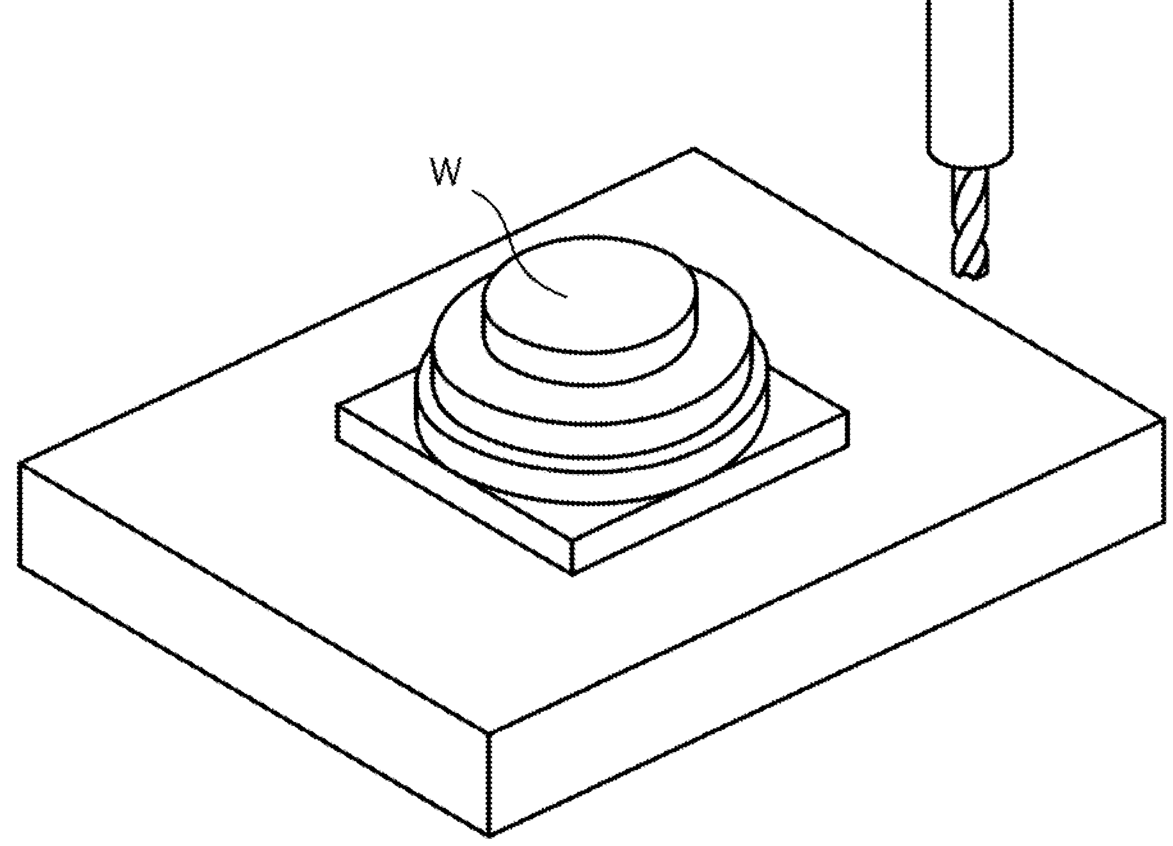
FIG. 6B is a diagram illustrating an example of machining simulation.

Next, the machining simulation unit 27 draws the tool at the position (X3, Y3, Z3) indicated by the feedback information of No. 3. Next, the machining simulation unit 27 draws the tool at the position (X4, Y4, Z4) indicated by the feedback information of No. 4. The machining simulation unit 27 performs machining simulation including tool change simulation by sequentially executing such processing based on synthesis information and shape information. The machining simulation unit 27 draws a result of executing machining simulation using the tool having tool number 1, for example, as illustrated in FIG. 6B.

Similarly, the machining simulation unit 27 draws the tool at the position (Xn, Yn, Zn) indicated by the feedback information of No. n. Furthermore, the machining simulation unit 27 performs drawing of tool change at this position. That is, the machining simulation unit 27 performs drawing in which tool change is performed from the flat end mill having tool number 1 to the ball end mill having tool number 2.

Figure 6C:
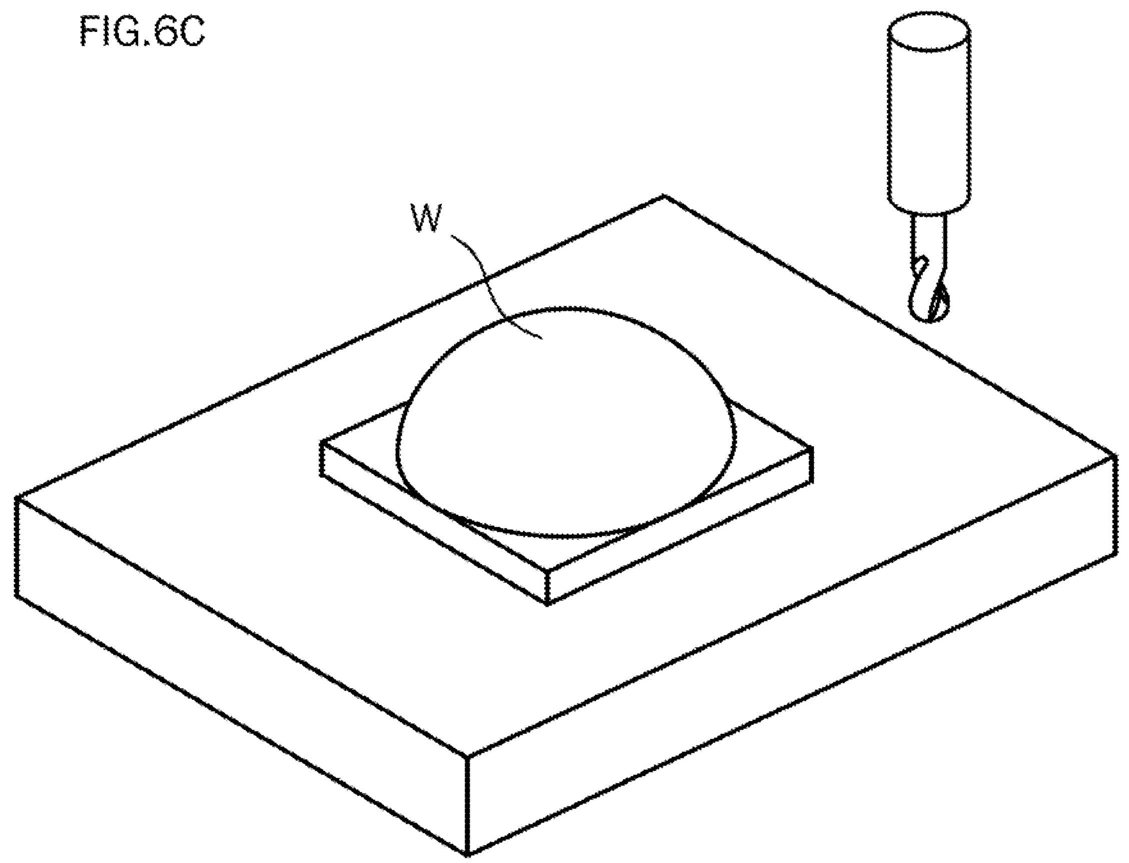
FIG. 6C is a diagram illustrating an example of machining simulation.

Next, the machining simulation unit 27 draws the tool at the position (Xn+1, Yn+1, Zn+1) indicated by the feedback information of No. n+1. When machining simulation using the tool having tool number 2 is ended, the machining simulation unit 27 draws a result of executing machining simulation using the tool having tool number 2, for example, as illustrated in FIG. 6C.

The output unit 28 outputs machined shape information indicating a shape of the workpiece W after machining, which is generated by executing machining simulation. Note that the output unit 28 may output not only the shape of the workpiece W after machining, but also a workpiece shape during machining drawn by the machining simulation unit 27 and information indicating an operation of the tool. For example, the output unit 28 outputs the machined shape information to a display screen of the input/output device 3.

Next, a flow of processing executed by numerical controller 2 will be described.

FIG. 7 is a diagram for describing an example of the flow of processing executed by the numerical controller 2.

In the numerical controller 2, first, the control unit 22 analyzes a machining program and controls an axis of the machine tool 1 (step S1).

Next, the feedback information acquisition unit 23 acquires feedback information indicating the position of each axis (step S2).

Next, the tool change information acquisition unit 24 acquires tool information and change information (step S3).

Next, the synthesis information generation unit 25 generates synthesis information by synthesizing the feedback information, the tool information, and the change information (step S4).

Next, the machining simulation unit 27 executes a machining simulation based on the synthesis information and shape information indicating a shape of the tool (step S5).

Next, the output unit 28 outputs machined shape information indicating a shape of the workpiece W after machining (step S6), and the process ends.

As described above, the numerical controller 2 includes the control unit 22 configured to analyze a machining program including tool information that specifies a tool and to control an axis of a machine tool 1, the feedback information acquisition unit 23 configured to acquire feedback information indicating a position of the axis from the machine tool 1, the tool change information acquisition unit 24 configured to acquire the tool information from the machining program and to acquire change information indicating that the tool has been changed from the machine tool 1, the synthesis information generation unit 25 configured to generate synthesis information by synthesizing the feedback information acquired by the feedback information acquisition unit 23 and the tool information and the change information acquired by the tool change information acquisition unit 24, the shape information storage unit 26 configured to store shape information indicating a shape of the tool, the machining simulation unit 27 configured to execute machining simulation of the workpiece W based on the synthesis information and the shape information, and the output unit 28 configured to output machined shape information indicating a shape of the workpiece W after machining generated by executing the machining simulation.

Therefore, it is possible to execute machining simulation by synchronously incorporating tool change simulation into simulation performed based on feedback information.

Furthermore, the synthesis information generation unit 25 generates synthesis information by causing a time axis related to acquisition of the feedback information to coincide with a time axis related to acquisition of the change information. Therefore, the numerical controller 2 can perform drawing by matching timing of tool change of the tool drawn by the machining simulation unit 27 with a time axis of time series data indicating a position of an axis.

Further, the feedback information acquisition unit 23 and the tool change information acquisition unit 24 acquire the feedback information and the change information, respectively, from the machine tool 1 within one control cycle. The change information is a signal indicating that tool change has been completed. Therefore, the numerical controller 2 can easily match timing of tool change drawn by the machining simulation unit 27 with the time axis of the time series data indicating the position of the axis.

In the embodiments described above, the tool change information acquisition unit 24 acquires the tool information from the machining program. However, the tool change information acquisition unit 24 may acquire the tool information from a device installed in the machine tool 1. For example, an ATC (Automatic Tool Changer) installed in the machine tool 1 has information indicating a tool number. Therefore, the tool change information acquisition unit 24 may acquire the tool information from the ATC together with the change information.

In the embodiments described above, the feedback information acquisition unit 23 and the tool change information acquisition unit 24 acquire the feedback information and the change information, respectively, within one control cycle. However, when the synthesis information generation unit 25 can make the time axis related to acquisition of the feedback information to coincide with the time axis related to acquisition of the change information, the feedback information and the change information do not necessarily have to be acquired within one control cycle.

For example, the feedback information acquisition unit 23 acquires information related to a time when the feedback information is acquired together with the feedback information. The information related to a time when the feedback information is acquired is provided by, for example, a timestamp. Further, the tool change information acquisition unit 24 acquires information related to a time when the change information is acquired together with the change information. In this case, the synthesis information generation unit 25 can synthesize the feedback information and the change information by causing both time axes to coincide with each other based on time information indicated by the timestamp.

The numerical controller 2 may further include a path error calculation unit. The path error calculation unit calculates a difference between a movement path of the tool calculated based on a command of the machining program and a movement path of the tool indicated by the feedback information.

The output unit 28 outputs a difference between the respective movement paths calculated by the path error calculation unit. In this way, an operator can easily check a difference between a movement path of the tool designated in the machining program and a movement path of the tool when each axis of the machine tool 1 is actually operated.

Note that the disclosure is not limited to the above embodiments, and can be modified as appropriate without departing from the spirit. In the disclosure, any component of the embodiments may be modified or any component of the embodiments may be omitted.

EXPLANATIONS OF LETTERS OR NUMERALS

1 MACHINE TOOL
2 NUMERICAL CONTROLLER
201 HARDWARE PROCESSOR
202 BUS
203 ROM
204 RAM
205 NONVOLATILE MEMORY
206 INTERFACE
207 AXIS CONTROL CIRCUIT
208 SPINDLE CONTROL CIRCUIT
209 PLC
210 I/O UNIT
21 PROGRAM STORAGE UNIT
22 CONTROL UNIT
23 FEEDBACK INFORMATION ACQUISITION UNIT
24 TOOL CHANGE INFORMATION ACQUISITION UNIT
25 SYNTHESIS INFORMATION GENERATION UNIT
26 SHAPE INFORMATION STORAGE UNIT
27 MACHINING SIMULATION UNIT
28 OUTPUT UNIT
3 INPUT/OUTPUT DEVICE
4 SERVO AMPLIFIER
5 SERVOMOTOR
6 SPINDLE AMPLIFIER
7 SPINDLE MOTOR
8 AUXILIARY DEVICE
W WORKPIECE

The invention claimed is:

1. A numerical controller comprising:

a processor configured to:

analyze a machining program including tool information that specifies a tool and to control an axis of a machine tool;

acquire feedback information indicating a position of the axis from the machine tool;

acquire the tool information from the machining program and to acquire change information indicating that the tool has been changed from the machine tool;

generate synthesis information by synthesizing the feedback information acquired by the feedback information acquisition unit and the tool information and the change information acquired by the tool change information acquisition unit;

store shape information indicating a shape of the tool;

execute machining simulation of a workpiece based on the synthesis information and the shape information; and output machined shape information indicating a shape of the workpiece after machining generated by executing the machining simulation.

2. The numerical controller according to claim 1, wherein the processor generates the synthesis information by causing a time axis related to acquisition of the feedback information to coincide with a time axis related to acquisition of the change information.

3. The numerical controller according to claim 2, wherein the processor acquires the feedback information and the change information from the machine tool within one control cycle.

4. The numerical controller according to claim 1, wherein the change information is a signal indicating that change of the tool has been completed.

* * * * *